United States Patent
Van Dingenen et al.

(10) Patent No.: US 11,872,875 B2
(45) Date of Patent: Jan. 16, 2024

(54) ELECTRIC DRIVELINE SYSTEM AND ELECTRIC DRIVELINE SYSTEM OPERATING METHOD

(71) Applicant: Dana Belgium N.V., Flanders (BE)

(72) Inventors: Joachim Van Dingenen, Drongen (BE); Bert Hannon, Bruges (BE); Jessica Versini, Bruges (BE)

(73) Assignee: DANA BELGIUM N.V., Bruges (BE)

( * ) Notice: Subject to any disclaimer, the term of this patent is extended or adjusted under 35 U.S.C. 154(b) by 193 days.

(21) Appl. No.: 17/447,405

(22) Filed: Sep. 10, 2021

(65) Prior Publication Data

US 2023/0084680 A1    Mar. 16, 2023

(51) Int. Cl.
*B60K 1/02*    (2006.01)
*B60K 17/04*   (2006.01)
*B60K 23/04*   (2006.01)

(52) U.S. Cl.
CPC .............. *B60K 1/02* (2013.01); *B60K 17/046* (2013.01); *B60K 2023/043* (2013.01)

(58) Field of Classification Search
CPC ..... F16H 2200/2005; F16H 2200/2035; F16H 2200/0021; F16H 3/78; F16H 57/0415; F16H 57/0434; F16H 57/0482; F16H 3/66; F16H 2200/0004; B60K 17/046; B60K 6/52; B60K 6/524; B60K 17/34; B60K 1/02; B60K 2023/043; B60B 35/125
See application file for complete search history.

(56) References Cited

U.S. PATENT DOCUMENTS

| | | | |
|---|---|---|---|
| 6,978,853 B2 | 12/2005 | Bennett | |
| 7,556,120 B2 | 7/2009 | Sah et al. | |
| 9,102,233 B2 | 8/2015 | Knoblauch et al. | |
| 9,221,334 B2 | 12/2015 | Knoblauch | |
| 9,435,415 B2 | 9/2016 | Gassmann | |
| 9,789,754 B2 | 10/2017 | Zhu et al. | |
| 10,457,134 B2 | 10/2019 | Morrow et al. | |
| 10,857,881 B2 | 12/2020 | Kumar | |
| 10,889,205 B2 | 1/2021 | Hettrich et al. | |
| 11,685,247 B2 * | 6/2023 | Bergström | F16H 37/0826 475/149 |
| 2012/0065016 A1 | 3/2012 | Tamai et al. | |
| 2013/0331216 A1 | 12/2013 | Tuckfield et al. | |

(Continued)

FOREIGN PATENT DOCUMENTS

| | | | | |
|---|---|---|---|---|
| DE | 102018201749 A1 * | 8/2019 | | |
| EP | 0489451 A2 | 6/1996 | | |
| WO | WO-2019160957 A1 * | 8/2019 | ............... | B60K 1/02 |

*Primary Examiner* — Roger L Pang
*Assistant Examiner* — Aimee Tran Nguyen
(74) *Attorney, Agent, or Firm* — McCoy Russell LLP

(57) ABSTRACT

Methods and systems for an electric driveline are provided. In one example, the electric driveline system includes a transmission with a planetary gearset, with a first gearset component rotationally coupled to a first electric machine and a second electric machine, and a first output interface and a second output interface rotationally coupled to a first axle and a second axle, respectively, and a second gearset component in the planetary gearset. The driveline system further includes a first friction clutch configured to selectively brake a third gearset component and a second friction clutch configured to selectively couple the first gearset component to an output shaft.

19 Claims, 5 Drawing Sheets

(56) References Cited

U.S. PATENT DOCUMENTS

| | | | | |
|---|---|---|---|---|
| 2016/0265652 A1* | 9/2016 | Nishimine | ............ | B60K 6/365 |
| 2019/0093755 A1* | 3/2019 | Kiyokami | ................ | F01P 11/08 |
| 2021/0372505 A1* | 12/2021 | McGrew, Jr. | .......... | B60K 17/08 |
| 2023/0011741 A1* | 1/2023 | Tatekawa | ............... | B60K 6/445 |

* cited by examiner

|  | First Gear Mode | Second Gear Mode |
|---|---|---|
| Clutch (148) |  | X |
| Clutch (162) | X |  |
| Synchronizer (160) | X |  |

ELECTRIC DRIVELINE SYSTEM AND ELECTRIC DRIVELINE SYSTEM OPERATING METHOD

TECHNICAL FIELD

The present disclosure relates to a multi-speed electric driveline system and a method for operation of said driveline system.

BACKGROUND AND SUMMARY

Multi-speed transmissions have been deployed in certain electric vehicles (EVs) due to their increased responsiveness and the gains in motor operating efficiency that the transmission affords when compared to EVs using single speed geartrains. Tradeoffs may however be made between the number of selectable gears and transmission efficiency due to losses that arise from geartrains with a comparatively high number of gears. Further, transmissions with a relatively high number of selectable gears may pose packaging constraints on other vehicle systems such as the suspension and energy storage systems. Further, previous powertrains have exhibited inefficiencies in their cooling system designs which use independent coolant loops for motor and transmission cooling.

U.S. Pat. No. 9,435,415 B2 to Gassmann discloses an electric drive for a motor vehicle. In one of the embodiments presented in Gassmann, the electric drive includes a switchable planetary drive with two planetary gear stages, which are coupled in parallel. The electric drive additionally includes a switching clutch with a sliding sleeve that allows the system to switch between multiple ratios by grounding two distinct ring gears in the system.

The inventors have recognized several drawbacks with Gassmann's transmission system as well as other previous electric drivelines. Gassmann's transmission may exhibit space inefficiencies due to the use of a multi-stage planetary gear reduction. Consequently, difficulties may arise when attempting to package the transmission into vehicle platforms with rigorous packaging demands. Using a multi-stage planetary reduction increases geartrain losses, when compared to transmissions with fewer stages. Further, the use of a single motor in Gassmann's system increases the chance of vehicle inoperability caused by motor degradation, in relation to electric drives with multiple motors. When a single motor is used in the system, inefficiencies may arise, under certain conditions.

The inventors have recognized the aforementioned issues and developed an electric driveline system. In one example, the electric driveline system includes a transmission. The transmission includes a planetary gearset with a first gearset component that is rotationally coupled to a first electric machine and a second electric machine. The transmission further includes a first output interface and a second output interface that are rotationally coupled to a first axle and a second axle, respectively. The transmission even further includes a second gearset component in the planetary gearset. The transmission additionally includes a first friction clutch that is coupled to a third gearset component in the planetary gearset and configured to selectively brake the third gearset component. A second friction clutch is additionally included in the transmission. The second friction clutch is configured to selectively couple the first gearset component to an output shaft. Arranging multiple friction clutches in the planetary assembly in this layout enables the transmission to efficiently and smoothly shift between two gear ratios in a compact geartrain that exhibits less losses than geartrains with greater numbers of stages. Further, using two electric machines in the system may permit the motors to be more efficiently operated and reduce the chance of driveline inoperability.

The electric driveline system may further include a third electric machine that mechanically drives a lubricant pump (e.g., an oil pump). The electric driveline system may include a control unit designed to adjust the speed of the pump based on a lubricant demand of the transmission. Mapping pump speed to lubrication demands increases system efficiency via a reduction in pumping losses, when compared to systems which drive a lubricant pump via a traction motor or engine and are therefore unable to adjust the pump's output based on current lubrication demands.

In another example, the driveline system may further include a heat exchanger that is coupled to a transmission housing or a vehicle frame. The heat exchanger is configured to transfer heat from a lubricant in the transmission to a coolant that is circulated through the heat exchanger. The coolant may be circulated through the heat exchanger as well as the first and second electric machines in parallel and/or in series. In this way, both the transmission and the electric machines may be efficiently cooled and an additional liquid to air heat exchanger for the transmission's lubrication circuit may be replaced by this liquid to liquid heat exchanger, if wanted. Consequently, the cooling system's space efficiency may be increased. Further, using this heat exchanger in the driveline system may enable additional tubing used to route coolant to a liquid to air heat exchanger, such as a radiator, to be omitted from the system, if wanted.

The transmission may further include a first axle disconnect clutch and a second axle disconnect clutch, in yet another example. Providing disconnect clutches at the axles permits the system's efficiency to be increased. In this way, the axles may be selectively disconnected when traction from one or both of the axles is not desired, thereby increasing vehicle efficiency. In other words, traction of the vehicle may be more granularly adjusted in relation to electric driveline systems which continuously deliver power to both drive axles regardless of operating conditions while the motors are active.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

An electric driveline with a transmission that compactly achieves at least two speeds with reduced drag, when compared to previous electric powertrains, is described herein. The transmission realizes this compact and low drag two-speed architecture through the use of two electric machines which drive a sun gear in a planetary arrangement (e.g., a simple planetary gearset). In the planetary arrangement, at least two friction clutches are coupled to different gears. The first clutch selectively brakes one of the gears in the planetary assembly (e.g., the ring gear), and the second clutch selectively permits power transfer from the sun gear directly to an output shaft. In this way, the transmission compactly achieves multi-speed functionality with lower drag when compared to previous transmissions such as transmissions with multi-stage planetary reductions.

The use of friction clutches enables the transmission to implement powershifting operation which reduces (e.g., substantially eliminates) torque interruptions during shifting transients. To further increase transmission efficiency, a transmission pump may be driven by a third electric machine that permits the pump to be strategically and independently operated to more aptly fulfill the lubrication demands of the transmission, when compared to pumps that are driven by a traction motor or internal combustion engine (ICE). In one example, the third electric machine may be designed to operate at a lower voltage than the first and second electric machines used for traction. In this way, the system can achieve greater flexibility that permits a lower cost pump, motor, and/or inverter to be used in the system, if wanted. Still further, front and rear axle disconnects may be provided on the output shaft to permit greater adaptability with regard to traction. For instance, the disconnect clutches may be operated to transition between two-wheel and four-wheel drive modes. For instance, four-wheel drive may be implemented under low traction conditions and two-wheel drive may be implemented when increased traction is not demanded, thereby decreasing losses and tire wear. Still further, a driveline control unit (DCU) may be utilized for power management in the driveline system and specifically to augment the distribution of electric power to the inverters and the corresponding electric machines as well as to control the clutches. The DCU may electronically communicate with the vehicle control unit (VCU) to permit the DCU to receive a wider breadth of vehicle operating data to more efficiently manage power distribution.

Figure 1:
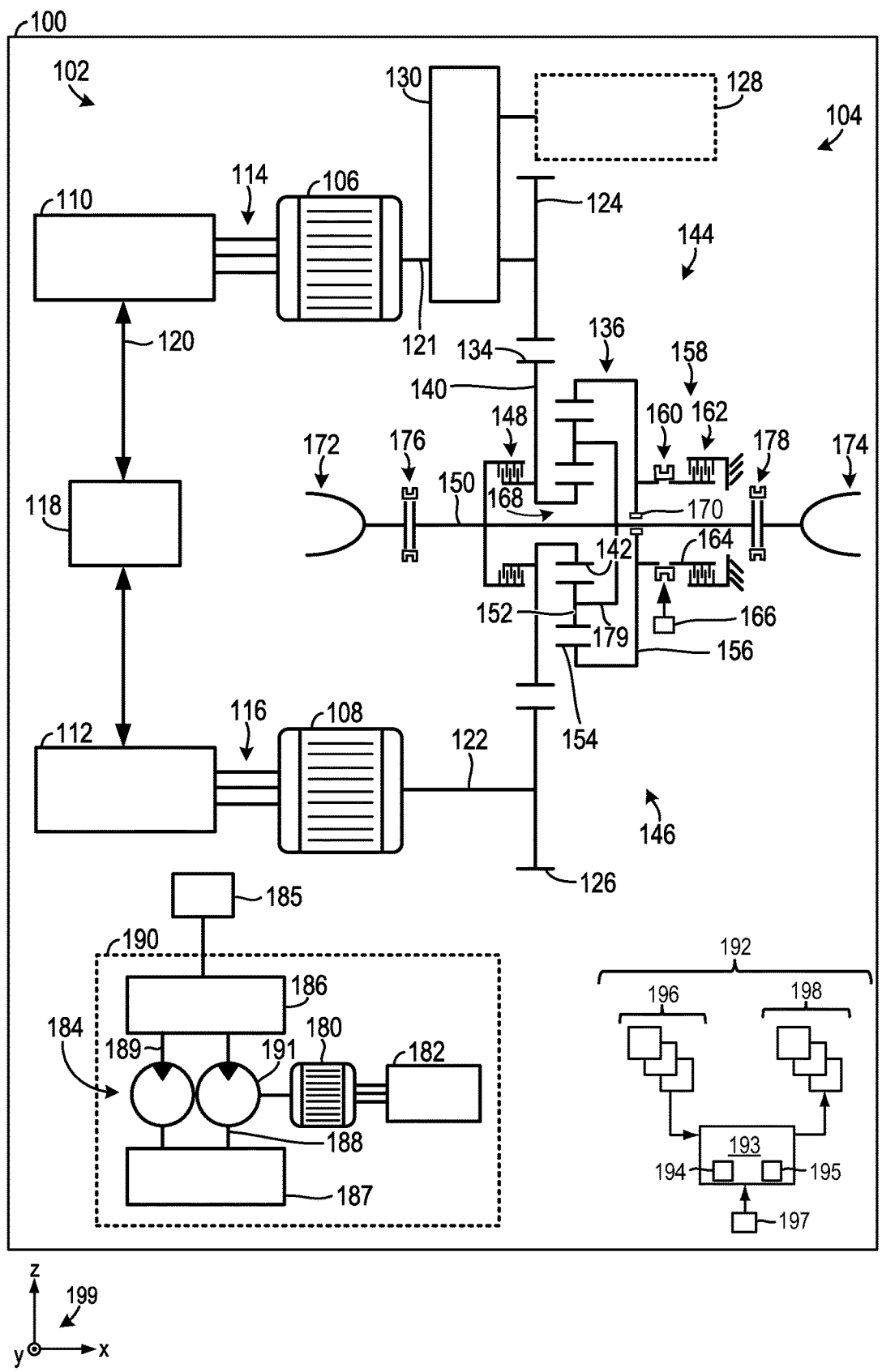
FIG. 1 shows a portion of a vehicle with an electric driveline system.

FIG. 1 depicts a vehicle 100 with an electric driveline system 102. As such, the vehicle 100 is an electric vehicle (EV) such as a battery electric vehicle (BEV). All-electric vehicles may specifically be used due to their reduced complexity and therefore reduced points of potential component degradation. However, hybrid electric vehicle (HEV) embodiments may be employed where the vehicle includes an internal combustion engine (ICE).

The electric driveline system 102 includes a transmission 104 that is rotationally coupled to a first electric machine 106 and a second electric machine 108. Each of the electric machines 106, 108 may include conventional components such as a rotor and a stator that electromagnetically interact during operation to generate motive power. Furthermore, the electric machines may be motor-generators which also generate electrical energy during regeneration operation. Further, the electric machines may have similar designs and sizes, in one example. In this way, manufacturing efficiency may be increased. However, the electric machines may have differing sizes and/or component designs, in alternate examples.

Further, the electric machines 106, 108 may be multi-phase electric machines that are supplied with electrical energy through the use of a first inverter 110 and a second inverter 112. These inverters and the other inverters described herein are designed to convert direct current (DC) to alternating current (AC) and vice versa. As such, the electric machines 106, 108 as well as the other electric machines may be AC machines. For instance, the electric machines 106, 108 and the inverters 110, 112 may be three-phase devices, in one use-case example. However, motors and inverters designed to operate using more than three phases have been envisioned. The electrical connections between the inverters 110, 112 and the electric machines 106, 108 is indicated via lines 114, 116 (e.g., multi-phase wires).

The inverters 110, 112 may receive DC power from at least one electrical energy source 118 (e.g., an energy storage device such a traction battery, a capacitor, combinations thereof, and the like, and/or an alternator). Arrows 120 indicate the flow of electrical energy from the energy source 118 to the electric machine 106, 108. Alternatively, each inverter may draw power from at least one distinct energy source. When both the inverters are coupled to one energy source, the inverters may operate at a similar voltage. Alternatively, if both inverters are coupled to distinct electrical energy sources, they may operate at a different voltage, in some examples.

Output shafts 121, 122 of the electric machines 106, 108 have gears 124, 126 which reside thereon, respectively. The system 102 may further include a mechanical power take-off (PTO) 128 and a gear and clutch assembly 130 which provides mechanical power to the mechanical PTO 128. For instance, a gear reduction and a disconnect clutch may be provided in the gear and clutch assembly 130. As such, the gear and clutch assembly 130 may be designed to mechanically couple and decouple the mechanical PTO 128 from the electric machine 106. Although the mechanical PTO 128 is designed to selectively rotationally couple to the first electric machine 106, the second electric machine 108 may, additionally or alternatively, have a mechanical PTO and an associated gear and clutch assembly coupled thereto.

The gears 124, 126 are each coupled to a gear 134 of a planetary gearset 136 in the transmission 104. The gears described herein include teeth and mechanical attachment between the gears involves meshing of the teeth. The planetary gearset 136 may include a shaft 140 which connects the gear 134 to a sun gear 142. The gears 124, 126 may specifically be positioned on different sides 144, 146 of the transmission 104 to enhance packaging and provide a more balanced weight distribution in the electric driveline system 102, if wanted. More generally, the rotational axes of the gears 124 and 126 as well as the electric machines 106 and 108 are parallel to one another.

A friction clutch 148 is coupled to the shaft 140 and designed to selectively rotationally couple the shaft to an output shaft 150. A friction clutch, as described herein, includes two sets of plates designed to frictionally engage and disengage one another while the clutch is opened and closed. As such, the amount of torque transferred through the clutch may be modulated depending on the degree of friction plate engagement. Thus, the friction clutches described herein may be operated with varying amounts of engagement (e.g., continuously adjusted through the clutch's range of engagement). Further, the friction clutches described herein may be wet friction clutches through which lubricant is routed to increase clutch longevity. However, dry friction clutches may be used in alternate examples. The friction clutch and the other friction clutches described herein may be adjusted via hydraulic, pneumatic, and/or electro-mechanical actuators. For instance, hydraulically operated pistons may be used to induce clutch engagement of the friction clutches. However, solenoids may be used for electro-mechanical clutch actuation, in other examples.

The sun gear 142 in the planetary gearset 136 is coupled to the shaft 140. Further, planet gears 152, in the planetary gearset 136, are coupled to the sun gear 142. Further, the planet gears 152 are mechanically coupled to a ring gear 154 in the planetary gearset 136. A shaft 156 extends from the ring gear 154 and has a second friction clutch assembly 158 residing thereon. The second friction clutch assembly 158 may include a synchronizer 160 arranged in series with a friction clutch 162. Placing the synchronizer 160 in series with the friction clutch 162 enables the transmission's efficiency to be increased when operating in the second gear. To elaborate, the synchronizer 160 permits a portion of the shaft 164 to be disconnected from the clutch 162 and freely rotate while the system operates in the second gear. As such, the plates in the clutch 162 may not rotate when the synchronizer is disengaged. Conversely, when the synchronizer is engaged, the shaft 164 a drum in the clutch 162 rotate in unison.

The synchronizer 160 is designed to synchronize the speed of the shaft 156 and a shaft 164 coupled to the friction clutch 162, and mechanically lock rotation of the shafts 156, 164, when engaged. For instance, the synchronizer 160 may include a sleeve with splines, ramped teeth, and the like to achieve the aforementioned functionality. A shift fork or other suitable actuator, schematically indicated at 166, may be used to engage and disengage the synchronizer. To increase system compactness, the friction clutches 148, 162 as well as the output shaft 150 may be coaxially arranged. To permit this coaxial arrangement, the sun gear 142 may include an opening 168 through which the output shaft extends.

The friction clutch 162 is designed to ground the ring gear 154. To accomplish the ring gear grounding, the friction clutch 162 may include a housing with a portion of the friction plates coupled thereto and fixedly attached to a stationary component, such as the transmission's housing. A bearing 170 may be positioned between the shaft 156 and the output shaft 150 to enable these shafts to independently rotate, during certain conditions.

The output shaft 150 includes output interfaces 172, 174 (e.g., yokes, splines, combinations thereof, or other suitable mechanical interfaces) designed to attach to axles via shafts, joints (e.g., U-joints), chains, combinations thereof, and the like.

Disconnect clutches 176, 178 may be provided for each of the output interfaces 172, 174. As such, the disconnect clutches 176, 178 may be designed to mechanically couple and decouple the output shaft 150 from the output interfaces 172, 174. In this way, the transmission's capabilities may be further expanded to enable single and multi-axle operation. For instance, four-wheel drive may be engaged when additional traction is desired and two-wheel drive may be engaged when the additional traction is not desired to reduce driveline losses and tire wear. In this way, the handling performance of the vehicle is enhanced. The disconnect clutches 176, 178 may be dog clutches, synchronizers, friction clutches, combinations thereof, or other suitable clutches. Dog clutches and/or synchronizers may be specifically used as axle disconnect devices, in some examples, to reduce losses when the clutches are disengaged, when compared to friction clutches.

The planet gears 152 rotate on a carrier 179 of the planetary gearset 136. The carrier 179 is rotationally coupled to the output shaft 150. The planetary gearset 136 may be a simple planetary gearset that solely includes the sun gear 142, ring gear 154, planet gears 152, and carrier 179. By using a simple planetary assembly, transmission compactness may be increased when compared to more complex planetary assemblies such as multi-stage planetary assemblies, Ravigneaux planetary assemblies, and the like. Consequently, the driveline system may pose less space constraints on other vehicle components, thereby permitting the system's applicability to be expanded. Further, losses in the transmission may be decreased when a simple planetary gearset is used as opposed to more complex gear arrangements.

Depending on the gear ratio of the transmission, mechanical power may travel through the carrier 179 to the output shaft 150 or from the sun gear 142 to the output shaft. Mechanical power paths through the transmission in the different gears and shifting operation (e.g., powershifting operation) between the operating gears are discussed in greater detail herein with regard to FIGS. 2A-2B.

A third electric machine 180 and inverter 182 may be provided in the system 102. The third electric machine 180 is designed to drive a transmission pump 184 which generates the flow of a fluid (e.g., a lubricant such as oil) through the transmission 104. It will be understood that lubricant as described herein is a fluid such as oil that may be used for lubricating components as well as for component actuation and/or cooling. Furthermore, a valve 186 is coupled to an output of the pump 184 and regulates the flowrate of lubricant through the transmission 104. The valve 186 may be in fluidic communication with components 185 (schematically depicted in FIG. 1) in the transmission 104 that receive lubricant. The lubricant may be routed to the desired components via lubricant conduits, jets, additional valves, manifolds, and the like. Further, the components 185 may include gears, clutches, hydraulic pistons for clutch actuation, and the like.

Once the lubricant is routed from the valve 186 to the lubricated components, the lubricant returns to a sump 187. Additionally, the sump 187 may be located in a transmission housing and profiled to gather lubricant from the lubricated components in the transmission. The pump 184 receives lubricant from the sump 187 via pick-up conduits 188. Conversely, the pump outlets 189 deliver lubricant to the valve 186. It will be understood that the pump 184, the valve 186, and the sump 187 are included in a lubrication system 190. The lubrication system 190 may further include conduits for routing the lubricant to targeted components in the transmission such as the planetary gearset, clutches, and the like. The pump is illustrated in FIG. 1 as a double pump with two pump modules 191, but other pump designs have been contemplated.

Further, by using a separate electric machine to drive the transmission pump 184, the electric machine's speed and therefore pump speed may be adjusted to track with the lubricant demands in the transmission. For instance, the pump speed may be increased during shifting transients and then decreased while the transmission is sustained in one of the two discrete operating gears. This reduces hydraulic losses and allows the hydraulic system to be downsized, if desired.

The third electric machine 180 and the inverter 182 may be operated with a lower voltage current than the first and second electric machines 106, 108 and corresponding inverters. For instance, the lower voltage may be in the following range: 12 Volts (V)–144V and the higher voltage may be in the following range: 350V-800V, in one use-case example. However, other higher and lower voltage values may be used, in other examples. In this way, the transmission's efficiency may be increased. However, in other examples the first electric machine 106, the second electric machine 108, and the third electric machine 180 may be operated at a similar voltage (e.g., a higher voltage within the range of 350V-800V or a lower voltage within the range of 12V-144V, in one use-case example).

The vehicle 100 further includes a control system 192 with a controller 193 as shown in FIG. 1. The controller 193 may include a microcomputer with components such as a processor 194 (e.g., a microprocessor unit), input/output ports, an electronic storage medium 195 for executable programs and calibration values (e.g., a read-only memory chip, random access memory, keep alive memory, a data bus, and the like). The storage medium may be programmed with computer readable data representing instructions executable by a processor for performing the methods and control techniques described herein as well as other variants that are anticipated but not specifically listed.

The controller 193 may receive various signals from sensors 196 coupled to various regions of the vehicle 100 and specifically the transmission 104. For example, the sensors 196 may include a pedal position sensor designed to detect a depression of an operator-actuated pedal such as an accelerator pedal and/or a brake pedal, a speed sensor at the transmission output shaft, energy storage device state of charge (SOC) sensor, clutch position sensors, etc. Motor speed may be ascertained from the amount of power sent from the inverter to the electric machine. An input device 197 (e.g., accelerator pedal, brake pedal, drive mode selector, two wheel and four-wheel drive selector, combinations thereof, and the like) may further provide input signals indicative of an operator's intent for vehicle control. For instance, buttons, switches, or a touch interface may be included in the vehicle to enable the operator to toggle between a two-wheel drive mode and a four-wheel drive mode.

Upon receiving the signals from the various sensors 196 of FIG. 1, the controller 193 processes the received signals, and employs various actuators 198 of vehicle components to adjust the components based on the received signals and instructions stored on the memory of controller 193. For example, the controller 193 may receive an accelerator pedal signal indicative of an operator's request for increased vehicle acceleration. In response, the controller 193 may command operation of the inverters to adjust electric machine power output and increase the power delivered from the machines to the transmission 104. The controller 193 may, during certain operating conditions, be designed to send commands to the clutches 148, 162 to engage and disengage the clutches. For instance, a control command may be sent to a clutch assembly and in response to receiving the command an actuator in the clutch assembly may adjust the clutch based on the command. The other controllable components in the vehicle may function in a similar manner with regard to sensor signals, control commands, and actuator adjustment, for example.

The controller 193 may be designed to control the clutches 148, 162 to synchronously shift between two of the transmission's operating gears. Further, the controller 193 may be designed to allocate mechanical power distribution to the mechanical PTO 128 and the planetary gearset 136 via operation of the gear and clutch assembly 130 based on a prioritization of a PTO power demand and a traction power demand. For instance, if PTO power demand is of a higher priority than the traction power demand and the PTO power demand increases, a clutch in the assembly 130 may be operated to disconnect the PTO and the electric machine 106 from the transmission output. Conversely, if traction power demand is of a higher priority than the PTO power demand and the traction power demand increases, the clutch in the assembly 130 may be operated to sustain connection or reconnect the PTO and the electric machine 106 to the transmission output. In this way, power distribution from the electric machine may match a prioritization of traction and PTO power set by the vehicle operator, for instance.

Figure 2A:
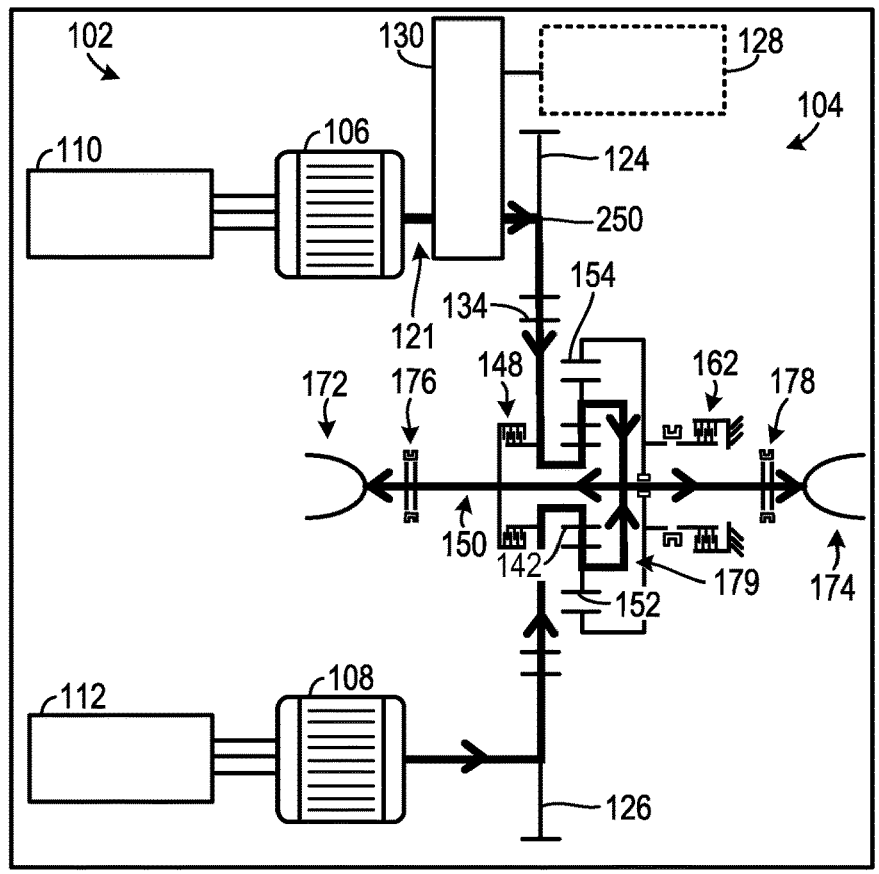
FIGS. 2A-2B show the power paths through the electric driveline system of FIG. 1 in a first gear configuration and a second gear configuration, respectively.
Figure 2B:
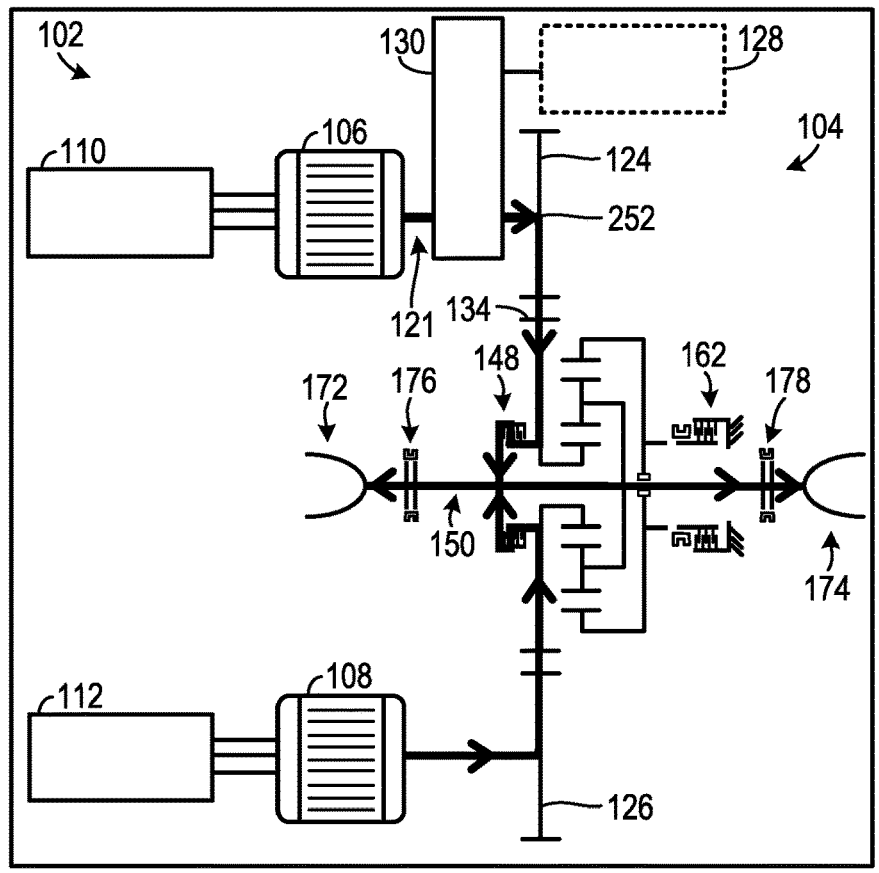

An axis system 199 is provided in FIG. 1, as well as FIGS. 2A-2B, for reference. The z-axis may be a vertical axis (e.g., parallel to a gravitational axis), the x-axis may be a lateral axis (e.g., horizontal axis), and/or the y-axis may be a longitudinal axis.

The transmission 104 has two clutches that enable it to function as a two-speed transmission. However, in other embodiments, additional clutches may be added to the transmission to enable it to be operated in a greater number of gears. As such, the transmission may have three or more speeds, in other embodiments.

In the first and second gears, depicted in FIGS. 2A and 2B, power bypasses the PTO 128 and flows to the gear 124 from the electric machine 106. To accomplish the PTO bypass functionality, the gear and clutch assembly may be adjusted to disconnect the PTO from the output shaft 121 of the electric machine 106.

FIGS. 2A and 2B show the power paths through the transmission 104 in the electric driveline system 102 in a first gear configuration and a second gear configuration, respectively, referred to as first and second gear modes. The power paths specifically correspond to drive mode operation (e.g., forward drive mode operation) in the system. It will be appreciated that the transmission's gear ratio in the first gear mode is higher than the gear ratio in the second gear mode. Thus, the first gear may be used during launch and subsequent acceleration while the second gear may be used for cruising operation, for instance. Further, as shown in FIGS. 2A and 2B, the disconnect clutches 176, 178 are engaged and therefore permit power to be transferred from the output shaft 150 both output interfaces 172, 174 and drive axles, correspondingly. However, one of disconnect clutches may be disengaged while the transmission is operating in the first gear and the second gear, when additional traction is not desired. For example, one of the disconnect clutches may be disengaged and vehicle correspondingly operates in a two-wheel drive mode when a vehicle operator requests said mode or when it is determined that the vehicle is not operating under low traction conditions.

Turning specifically to FIG. 2A, while the transmission 104 is operating in the first gear mode, the ring gear 154 is held stationary by the friction clutch 162 and the clutch 148 is disengaged. The mechanical power path in the first gear mode (denoted via arrows 250) unfolds as follows: mechanical power moves from the first and second electric machines 106, 108 to the gear 124, 126, respectively, from the gears 124, 126 to the gear 134, from the gear 134 to the sun gear 142, from the sun gear to the planet gears 152, from the planet gears to the carrier 179, and from the carrier to the output shaft 150.

While the transmission 104 is operating in the second gear mode, as shown in FIG. 2B, the clutch 148 is engaged to permit mechanical power transfer between the gear 134 and the output shaft 150 and the clutch 162 is disengaged. In the second gear mode, the mechanical power path (denoted via arrows 252) unfolds as follows: mechanical power moves from the first and second electric machines 106, 108 to the gears 124, 126, respectively, from the gears 124, 126 to the gear 134, from the gear 134 to the clutch 148, and from the clutch 148 to the output shaft 150.

Figure 3A:
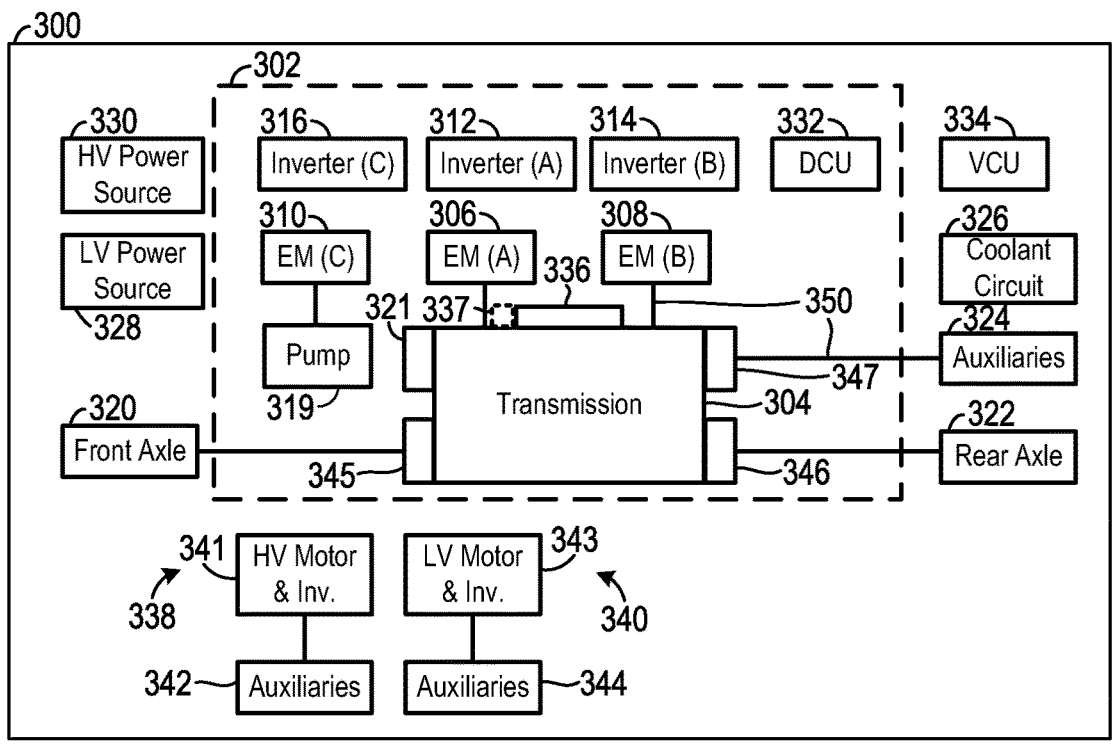
FIG. 3A-3C show mechanical, hydraulic, and electrical connections, respectively, in an electric driveline system of a vehicle.
Figure 3B:
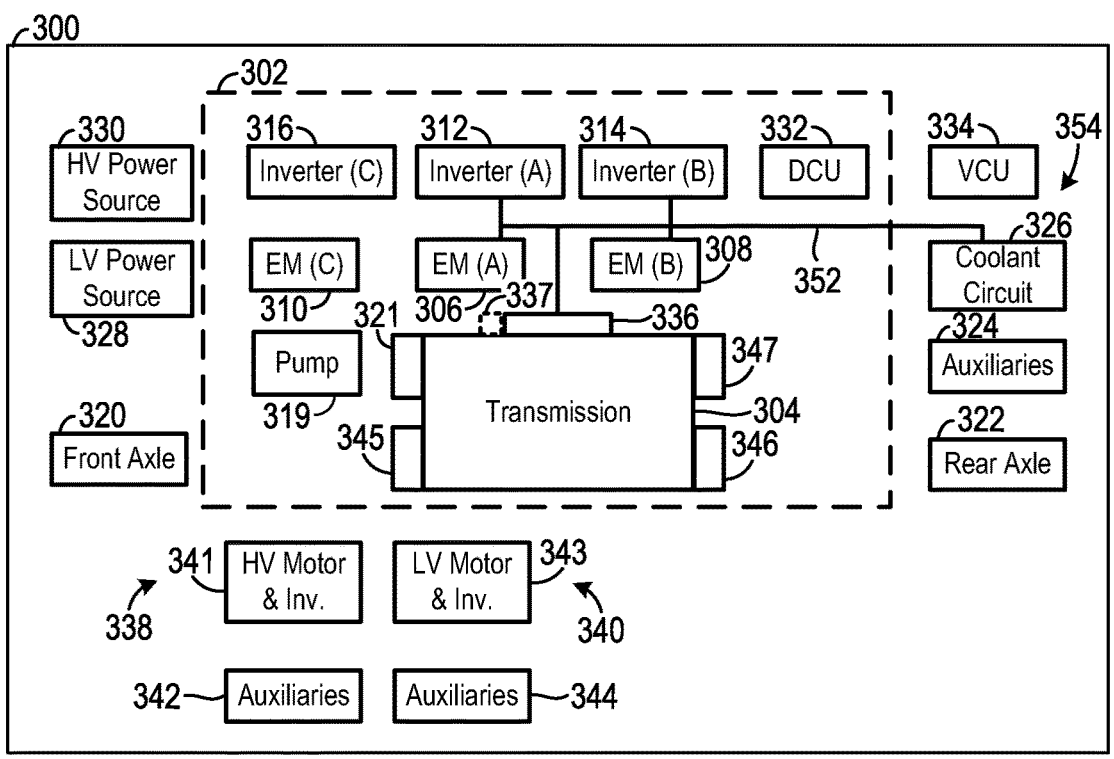
Figures 2C, 3C:
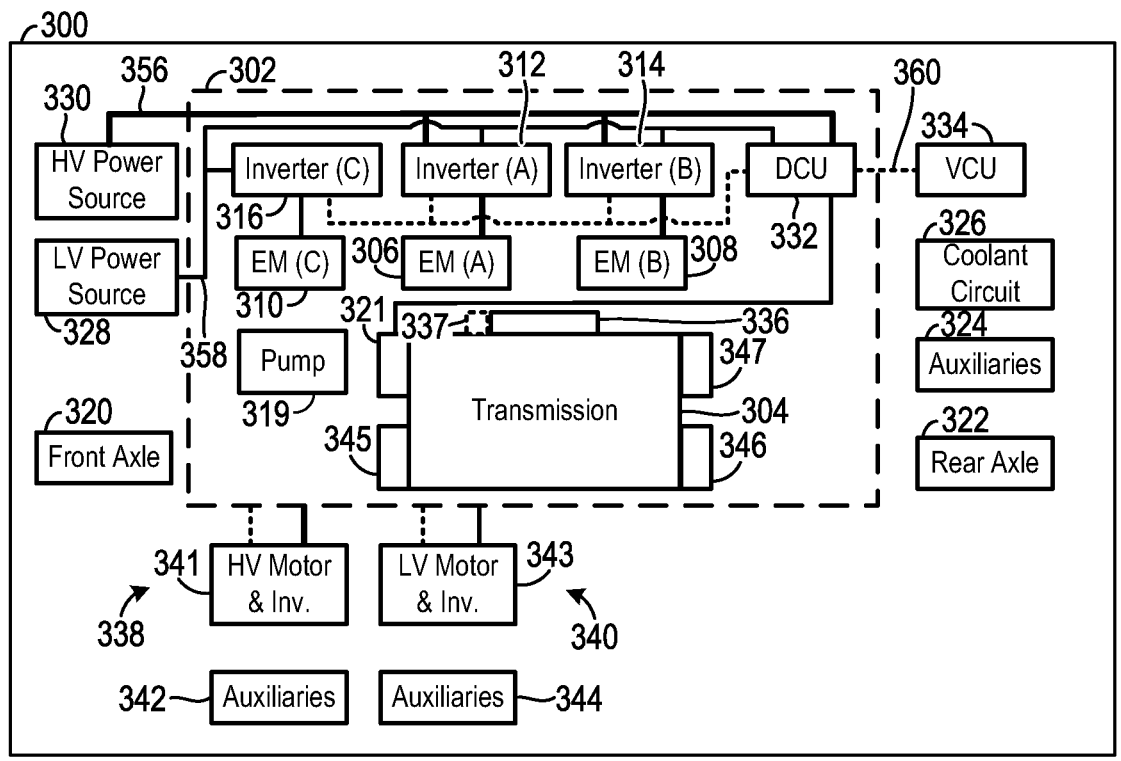
FIG. 2C shows a chart correlating clutch position and gear configuration in the electric driveline system operating states depicted in FIGS. 2A and 2B.

FIG. 2C shows a chart 260 that correlates the configurations of the friction clutches 148, 162 and the synchronizer 160 to the first and second gear modes. An "X" denotes clutch engagement and a blank field conversely denotes clutch disengagement. Specifically, in the first gear mode, the friction clutch 148 is disengaged and the friction clutch 162 as well as the synchronizer 160 are engaged. Conversely, in the second gear mode, the friction clutch 148 is engaged and the friction clutch 162 as well as the synchronizer 160 are disengaged. To powershift between the first gear and the second gear, the clutch 148 may be engaged while the clutch 162 is disengaged. Subsequently to disengagement of the clutch 162, the synchronizer 160 may be disengaged. Conversely, to shift from the second gear back to the first gear, the synchronizer 160 may first be engaged and subsequently the clutch 162 may be engaged while the clutch 148 is disengaged. It will be understood that the synchronizer may be omitted from the system, in some examples. When powershifting is implemented in the transmission, power interruptions during shifting may be substantially avoided, thereby enhancing shifting performance.

FIG. 3A-3C show another example of a vehicle 300 with an electric driveline system. The boundary of the electric driveline system is denoted via dashed lines 302. However, it will be appreciated that the system may include a different grouping of components, in other examples. The electric driveline system 302 includes a transmission 304. The electric driveline system 302 with the transmission 304 shown in FIGS. 3A-3C may share common features with the electric driveline system 102 and the transmission 104 shown in FIGS. 1-2B. Redundant description is therefore omitted. FIGS. 3A-3C specifically illustrate the mechanical, coolant, and electrical connections, respectively, between components in the electric driveline system 302 as well as other vehicle components. Although the mechanical, coolant, and electrical connections are illustrated in separate figures for clarity, it will be understood that these connections may all be present in the electric driveline system.

The driveline system 302, shown in FIGS. 3A-3C, include a first electric machine 306, a second electric machine 308, and a third electric machine 310. The electric driveline system 302 further includes a first inverter 312, a second inverter 314, and a third inverter 316 that are associated with the first electric machine 306, the second electric machine 308, and the third electric machine 310, respectively. The vehicle 300 further includes a pump 319 that is designed to circulate lubricant (e.g., oil) in the transmission 304. A valve 321 coupled to the transmission 304 may be used to regulate lubricant flow from the pump 319 to the transmission.

The vehicle 300 further includes a first axle 320 (e.g., a front axle) and a second axle 322 (e.g., rear axle). The vehicle 300 may further include auxiliary devices 324, such as a steering pump, an air conditioning pump, a hydraulic pump for working functions, and the like. Still further, the vehicle may include a coolant circuit 326, a lower voltage power source 328 (e.g., a battery, a capacitor, combinations thereof, and the like), and a higher voltage power source 330 (e.g., a battery, a capacitor, combinations thereof, and the like). The driveline system 302 may include a DCU 332 and the vehicle 300 may include a VCU 334. However, other control unit arrangements have been contemplated, such as a common control unit which is used to adjust operation of both the driveline system 302 and components in the vehicle 300. Each of the control units may include any know data storage mediums (e.g., random access memory (RAM), read only memory (ROM), keep alive memory, combinations thereof, and the like) and a processor (e.g., micro-processor unit) designed to execute instructions stored in the data storage mediums. As such, the DCU 332 and/or the VCU 334 may perform the control methods, techniques, schemes, etc. described herein such as the method shown in FIG. 4. Further the DCU may be designed to coordinate operation of the inverters 312, 314, and 316 to increase the system's efficiency. For instance, the DCU may be operated to balance power between the inverter 312 and 314 to increase the driveline system's efficiency. Specifically, in one example, the DCU may operate the inverter 312 and 314 to reduce torque generated by one of the electric machines and increase torque generated by the other electric machine such that they operate in a target efficiency point or range. Additionally, the DCU may be operated to control the inverter 316 to enable a desired lubricant flow to be achieved. The DCU may further be designed to implement fault reactions and diagnostics. For example, the DCU may implement a limp home mode when minor component degradation is detected, such as a degradation of a speed sensor. Further, the DCU may shutdown if the controller area network (CAN) is degraded, in some scenarios.

A heat exchanger 336 may further be coupled to (e.g., directly coupled to or incorporated into) the transmission 304. In other examples, the heat exchanger 336 may be coupled to a vehicle frame 337. The heat exchanger 336 may include components for transferring thermal energy between a coolant circuit and an oil circuit, such as adjacent coolant and oil passages, a housing, and the like. In this way, heat may be efficiently removed from the transmission's lubrication circuit. In one example, the heat exchanger 336, such as a liquid-liquid cooler, may be bolted or otherwise mechanically attached to the transmission housing. In another example, the heat exchanger 336 may be formed by integrating coolant passages into the sump housing.

Electric PTOs 338, 340 may further be included in the vehicle 300. The electric PTO 338 may include a higher voltage motor and an inverter 341 coupled to auxiliary devices 342 (e.g., a steering pump, a pump for working hydraulic devices, an air conditioning pump, and the like). The electric PTO 340 may include a lower voltage motor and an inverter 343 coupled to auxiliary devices 344. Providing electric PTOs in the vehicle expands the vehicle's capabilities and adaptability. Consequently, the driveline system may be used in a wider variety of vehicle platforms. Furthermore, by using electric PTOs that operate with different voltages, the motors in the PTOs may be granularly tuned to meet the demands of the specific auxiliary devices to which they are attached, if wanted. However, in other examples, the electric PTO may be operated using a similar voltage.

The driveline system 302 may further include a first axle disconnect clutch 345 and a second axle disconnect clutch 346. Each of the disconnect clutches may be friction clutches, dog clutches, or other suitable clutches that are designed to rotationally couple and decouple the transmission output interfaces from the corresponding axle. A mechanical PTO 347 may further be coupled to the transmission 304 and the auxiliary devices 324.

FIG. 3A maps the mechanical connections between the components in the driveline system 302 as well as the vehicle 300. These mechanical connections are denoted via lines 350. The mechanical connections may be formed via shafts, joints, belts, chains, combinations thereof, and the like. As shown, the first electric machine 306 and the second electric machine 308 are rotationally coupled to the transmission 304. Providing two electric machines mechanically coupled to the transmission may permit driveline efficiency to be increased. Further, the likelihood of the driveline system becoming inoperable due to motor degradation is reduced when there is electric machine redundancy in the driveline system.

The transmission 304 is also rotationally coupled to the first axle 320 and the second axle 322, and the disconnect clutches 345, 346 may permit the axles to be connected and disconnected from the transmission 304 according to operator input and/or vehicle operating conditions, for instance.

The third electric machine 310 may be rotationally coupled to the pump 319 and the pump may be in fluidic communication with the transmission 304 via the valve 321. The third electric machine 310 may be operated independently from the first and second electric machines 306, 308. To elaborate, the third electric machine 310 may be adjusted to more aptly track with the lubricant demands of the transmission. In this way, the system's efficiency can be increased without impacting transmission lubrication operation, if wanted.

The mechanical PTO 347 is mechanically coupled to the auxiliary devices 324. Further, the electric PTOs 338, 340 are mechanically coupled to the auxiliary devices 342, 344, respectively. In this way, the system's PTO capabilities may be expanded to meet a variety of auxiliary device demands across a wide breadth of vehicle platforms. The system's customer appeal is consequently increased.

FIG. 3B shows the coolant connections, denoted via lines 352, in a cooling assembly 354 of the electric driveline system 302. The coolant connections may be established via conduits, ducts, and the like which are routed (e.g., internally and/or externally routed) through various system components. The coolant may include water and/or glycol. The cooling assembly 354 may include the coolant circuit 326 which may have a coolant pump and a heat exchanger. As shown, coolant may be routed to the heat exchanger 336, the first electric machine 306, the second electric machine 308, the first inverter 312, and the second electric machine 308 in parallel. Additionally or alternatively, the coolant may be routed to one or more of the following components in series: the heat exchanger 336, the first electric machine 306, the second electric machine 308, the first inverter 312, and the second electric machine 308. In this way, the electric machines, inverters, and transmission lubricant may be efficiently cooled. The heat exchanger 336 is designed to transfer heat from lubricant (e.g., oil) routed through the transmission to coolant in the cooling assembly 354. Providing the heat exchanger with an oil to coolant heat transfer functionality permits a liquid to air heat exchanger, such as a radiator, to be omitted from the system, if wanted. The system's size, complexity, and/or manufacturing costs may be reduced, as a result.

Alternatively, the first and/or second electric machines 306, 308 as well as the first and/or second inverters 312, 314 may be oil cooled. In such an example, the heat exchanger 336 may be omitted from the system.

FIG. 3C shows electrical and data connections in the vehicle 300 and the electric driveline system 302. The electrical connections are specifically divided into higher voltage connections (denoted by thicker lines 356) and lower voltage connections (denoted by thinner lines 358). Data connections are denoted via dashed lines 360. The higher voltage connections emanate from the higher voltage power source 330 and the lower voltage connections emanate from the lower voltage power source 328. In one use-case example, the lower voltage may in the range between 12V and 144V and the higher voltage may be in the range between 350V and 800V.

The higher voltage power source 330 may be electrically coupled to the first inverter 312, the second inverter 314, and the DCU 332. Likewise, higher voltage electrical connections may be established between the first and second electric machines 306, 308 and the first and second inverters 312, 314. A higher voltage connection may additionally be established between the electric PTO 338 and the driveline system 302.

The lower voltage power source 328 may be electrically coupled to the first inverter 312, the second inverter 314, the third inverter 316, and/or the DCU 332. A lower voltage connection may additionally be established between the third inverter 316 and the third electric machine 310 as well as the electric PTO 340 and the driveline system 302. Further, a lower voltage connection may be established between the DCU 332 and the valve 321.

Data connections may be established between the VCU 334 and the DCU 332. For instance, operating condition data such as vehicle speed, pedal position (e.g., brake pedal position and/or accelerator pedal position), drive mode selector positon, and the like may be transferred from the VCU to the DCU. Conversely, operating condition data such as electric machine speed, electric machine temperature, power source SOC, clutch position, transmission temperature, and the like may be transferred from the DCU to the VCU. In this way, data may be shared between the DCU and the VCU to enhance control routines at each control unit. A data connection may also be established between the DCU 332 and the first inverter 312, the second inverter 314, and/or the third inverter 316. Further, data may be transferred from the electric PTOs 338 and 340 to the driveline system 302.

Figure 4:
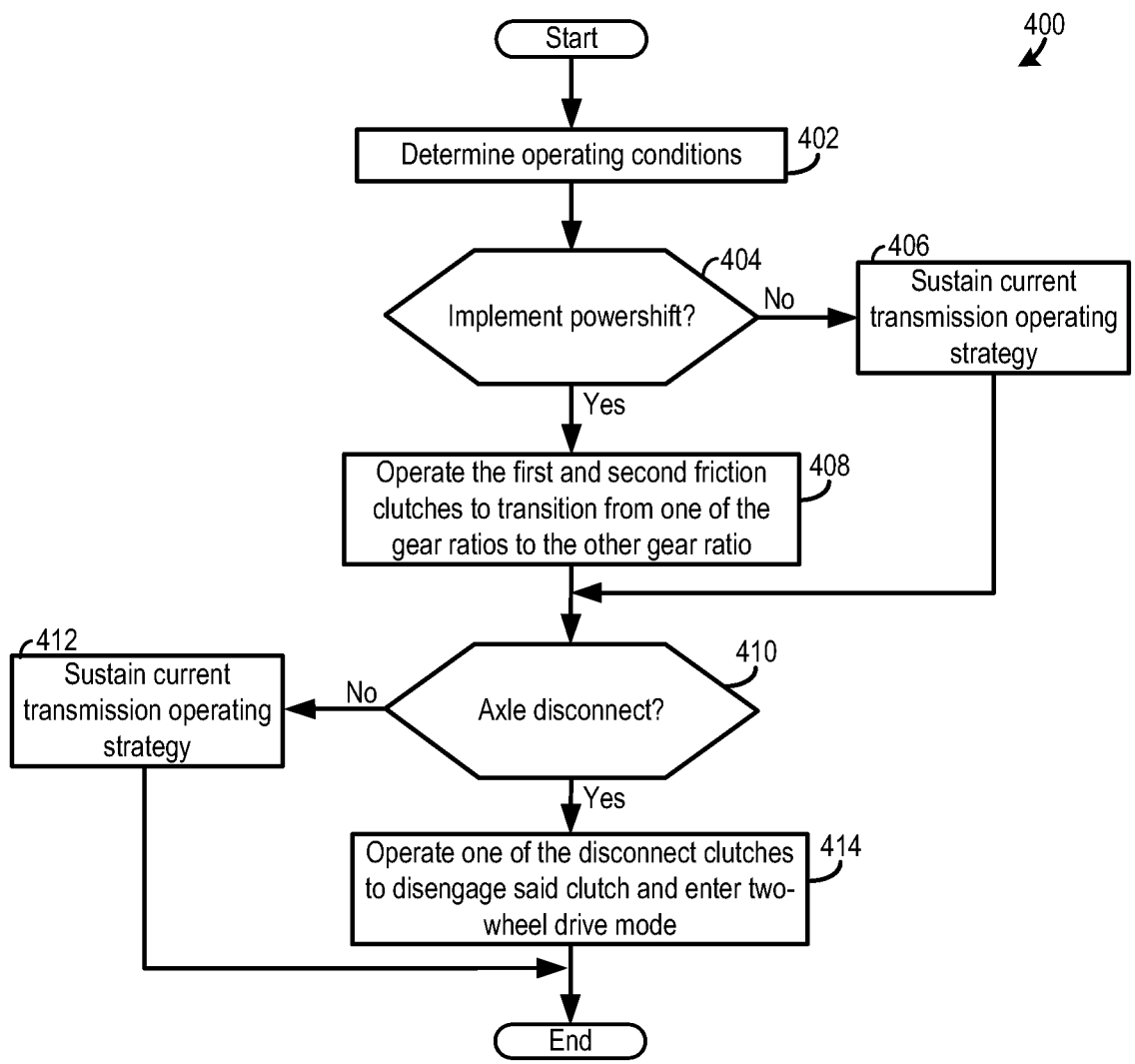
FIG. 4 shows a method for operation of an electric driveline system.

FIG. 4 shows a method 400 for operation of an electric driveline system. The method 400 may be carried out via the electric driveline systems 102 and/or 302, discussed above with regard to FIGS. 1-3C, in one example. However, in other examples, the method 400 may be implemented by other suitable electric driveline systems. Instructions for carrying out method 400 may be executed by a controller, such as the controller 193 in FIG. 1 or the DCU 332 and/or the VCU 334 in FIGS. 3A-3C, by executing instructions stored on a memory of the controller and in conjunction with signals received from sensors at the controller. The controller may employ actuators in different system components to implement the method steps described below.

At 402, the method includes determining operating conditions. The operating conditions may include speeds of the electric machines, transmission output shaft speed, vehicle speed, clutch positon, pedal position, transmission load, and the like.

At 404, the method judges if the transmission should be powershifted between two of the operating gear ratios. The powershift judgement may be carried out based on a transmission speed and/or load threshold that may trigger a shift event in the transmission.

If it is judged that the transmission should not be powershifted between gears (NO at 404), the method moves to 406. For instance, the vehicle speed may remain in a range above or below a threshold that triggers a shifting event. At 406, the method includes sustaining the current transmission operating strategy. For instance, the transmission may be held in its current operating gear by sustaining engagement of one of the friction clutches and disengagement of the other friction clutch.

Conversely, if it is judged that the transmission should be powershifted between two of the transmission's operating gears (YES at 404) the method moves to 408. For example, the vehicle speed may surpass or fall below a threshold speed that triggers a transmission shift event. At 408, the method includes operating a first friction clutch and a second friction clutch to transition from one gear ratio to another. For instance, when shifting from the first gear to the second gear, the first clutch (e.g., clutch 162, shown in FIG. 1) may be disengaged while the second clutch (e.g., clutch 148, shown in FIG. 1) is engaged. Through the coordinated (e.g., simultaneous) engagement and disengagement of the clutches in this manner, power interruptions during shifting transients may be reduced, thereby increasing transmission efficiency.

At 410, the method judges if one of the axles should be disconnected. The axle disconnect judgment may take into account vehicle traction and/or operator interaction with an input device that permits selection of two or four-wheel drive modes. For instance, if vehicle traction is above a threshold value or the operator selects a two-wheel drive mode, a judgement may be made to disconnect one of the axles.

If it is determined that one of the axles should not be disconnected (NO at 410) the method moves to 412 where the method includes sustaining the current transmission operating strategy. For instance, engagement of both of the disconnect clutches in the transmission may be sustained.

Conversely, if it is determined that one of the axles should be disconnected (YES at 410) the method advances to 414 where the method includes operating one of the disconnect clutches to disengage said clutch and enter two-wheel drive mode. In this way, vehicle traction may be adapted based on an operator request or in response to changes in environmental conditions.

The technical effect of the electric driveline system operating method described herein is to efficiently shift between two of the transmission's operating gears with a reduced amount of power interruption. The transmission efficiency may be consequently increased and noise, vibration, and harshness (NVH) during shifting transients may be reduced, thereby enhancing customer satisfaction. Another technical effect of the electric driveline system operating method is to strategically operate axle disconnects to vary the vehicle's traction to suit driving environment conditions. Consequently, losses in the driveline may be reduced when multi-axle drive operation is not desired.

FIGS. 1-2B and 3A-3C show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, an electric driveline system is provided that comprises a transmission including: a planetary gearset with a first gearset component that is rotationally coupled to a first electric machine and a second electric machine; a first output interface and a second output interface rotationally coupled to a first axle and a second axle, respectively, and a second gearset component in the planetary gearset; a first friction clutch coupled to a third gearset component in the planetary gearset and configured to selectively brake the third gearset component; and a second friction clutch configured to selectively couple the first gearset component to an output shaft.

In another aspect, a method for operation of an electric driveline system is provided that comprises transferring rotational energy to a sun gear of a planetary gearset from a first electric machine and a second electric machine; and shifting between a first gear configuration and a second gear configuration via: engagement of a first friction clutch coupled to a ring gear of the planetary gearset and a synchronizer coupled to the first friction clutch; and disengagement of a second friction clutch coupled to the sun gear of the planetary gearset; and transferring rotational energy to one or more of a first axle and a second axle from a carrier in the planetary gearset. The method may further comprise, in one example, transferring rotational energy from the first electric machine to a power take-off (PTO). In another example, the method may further comprise disconnecting the first axle from the electric driveline system via operation of a first disconnect clutch. In yet another example, the method may further comprise disconnecting the second axle from the electric driveline system via operation of a second disconnect clutch.

In yet another aspect, an electric driveline system is provided that comprises a powershift transmission including: a planetary gearset with sun gear rotationally coupled to a first electric machine and a second electric machine; a first output interface and a second output interface coupled to a carrier in the planetary gearset and to a first axle and a second axle, respectively; a first friction clutch and a synchronizer coupled to a ring gear in the planetary gearset, wherein the first friction clutch is configured to brake the ring gear to shift the planetary gearset between a first gear configuration and a second gear configuration; and a second friction clutch coupled to the sun gear and configured to selectively couple the sun gear to an output shaft.

In any of the aspects or combinations of the aspects, the electric driveline system may further comprise a control unit including instructions that when executed cause the control unit to: operate the first friction clutch and the second friction clutch to synchronously shift between a first gear configuration and a second gear configuration.

In any of the aspects or combinations of the aspects, the first gearset component may be a sun gear, the second gearset component may be a carrier, and the third gearset component may be a ring gear.

In any of the aspects or combinations of the aspects, the electric driveline system may further include a third electric machine mechanically driving a lubricant pump; and a control unit including instructions that when executed cause the control unit to: adjust a speed of the lubricant pump based on a lubricant demand of the transmission; wherein: the third electric machine may receive electric power from a lower voltage inverter and the first and second electric machines receive electric power from higher voltage inverters; or the first electric machine, the second electric machine, and the third electric machine receive electric power from inverters that operate with a similar voltage.

In any of the aspects or combinations of the aspects, the electric driveline system may further comprise a coolant circuit with coolant conduits routed through the first and second electric machines and a heat exchanger coupled to the transmission.

In any of the aspects or combinations of the aspects, the first and second electric machines may be parallel to one another.

In any of the aspects or combinations of the aspects, the electric driveline system may further comprise a first disconnect clutch and a second disconnect clutch coupled to the first and second output interfaces, respectively.

In any of the aspects or combinations of the aspects, the electric driveline system may further comprise a mechanical power take-off (PTO) and a PTO clutch coupled to the output shaft of the first electric machine or the second electric machine.

In any of the aspects or combinations of the aspects, the electric driveline system may further comprise a control unit including instructions that when executed cause the control unit to: allocate mechanical power distribution to the mechanical PTO and the output shaft based on a prioritization of a PTO power demand and a traction power demand.

In any of the aspects or combinations of the aspects, the step of shifting between the first gear configuration and the second gear configuration may be implemented by a driveline control unit (DCU) in electronic communication with a vehicle control unit (VCU).

In any of the aspects or combinations of the aspects, the electric driveline system may further comprise a mechanical power take-off (PTO) and a PTO clutch coupled to the output shaft of the first electric machine or the second electric machine; and a control unit including instructions that when executed cause the control unit to: allocate mechanical power distribution to the mechanical PTO and the planetary gearset based on a prioritization of a PTO power demand and a traction power demand.

In any of the aspects or combinations of the aspects, the electric driveline system may further comprise a third electric machine mechanically driving a lubricant pump; and a control unit including instructions that when executed cause the control unit to: operate the lubricant pump and a valve coupled to the powershift transmission to adjust the flowrate of lubricant to the planetary gearset based on lubrication demands of the powershift transmission.

In any of the aspects or combinations of the aspects, the third electric machine may receive electric power from a lower voltage inverter and the first and second electric machines receive electric power from higher voltage inverters; or the first electric machine, the second electric machine, and the third electric machine may receive electric power from inverters that have a similar operating voltage.

In any of the aspects or combinations of the aspects, the electric driveline system may further include a heat exchanger coupled to a transmission housing or a vehicle frame and configured to transfer heat from a lubricant in the transmission to a coolant that is circulated through the heat exchanger.

In another representation, an electric transmission is provided that includes a multi-speed planetary gearset coupled to a first traction motor and a second traction motor and including a first friction clutch that is configured to selectively brake and ring gear, a synchronizer arranged in series with the first clutch, and a second friction clutch configured to selectively mechanically couple a sun gear in the multi-speed planetary gearset to an output shaft.

Note that the example control and estimation routines included herein can be used with various powertrain, electric drive, and/or vehicle system configurations. The control methods and routines disclosed herein may be stored as executable instructions in non-transitory memory and may be carried out by the control system including the controller in combination with the various sensors, actuators, and other transmission and/or vehicle hardware in combination with the electronic controller. As such, the described actions, operations, and/or functions may graphically represent code to be programmed into non-transitory memory of the computer readable storage medium in the vehicle and/or driveline control system. The various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of electric machines, internal combustion engines, and/or transmissions. The subject matter of the present disclosure includes all novel and non-obvious combinations and sub-combinations of the various systems and configurations, and other features, functions, and/or properties disclosed herein.

As used herein, the term "substantially" is construed to mean plus or minus five percent of the range, unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric driveline system, comprising:
a transmission including:
a planetary gearset with a first gearset component that is rotationally coupled to a first electric machine and a second electric machine;
a first output interface and a second output interface rotationally coupled to a first axle and a second axle, respectively, and a second gearset component in the planetary gearset;
a first friction clutch coupled to a third gearset component in the planetary gearset and configured to selectively brake the third gearset component;
a second friction clutch configured to selectively couple the first gearset component to an output shaft; and
a first disconnect clutch and a second disconnect clutch coupled to the first and second output interfaces, respectively.

2. The electric driveline system of claim 1, further comprising a control unit including instructions that when executed cause the control unit to
operate the first friction clutch and the second friction clutch to synchronously shift between a first gear configuration and a second gear configuration.

3. The electric driveline system of claim 1, wherein the first gearset component is a sun gear, the second gearset component is a carrier, and the third gearset component is a ring gear.

4. The electric driveline system of claim 1, further comprising:
a third electric machine mechanically driving a lubricant pump; and
a control unit including instructions that when executed cause the control unit to:
adjust a speed of the lubricant pump based on a lubricant demand of the transmission;
wherein:
the third electric machine receives electric power from a lower voltage inverter and the first and second electric machines receive electric power from higher voltage inverters; or
the first electric machine, the second electric machine, and the third electric machine receive electric power from inverters that operate with a similar voltage.

5. The electric driveline system of claim 1, further comprising a coolant circuit with coolant conduits routed through the first and second electric machines and a heat exchanger coupled to the transmission.

6. The electric driveline system of claim 1, wherein the first and second electric machines are arranged parallel to one another.

7. The electric driveline system of claim 1, further comprising a mechanical power take-off (PTO) and a PTO clutch coupled to the output shaft of the first electric machine or the second electric machine.

8. The electric driveline system of claim 7, further comprising a control unit including instructions that when executed cause the control unit to:
allocate mechanical power distribution to the mechanical PTO and the output shaft based on a prioritization of a PTO power demand and a traction power demand.

9. The electric driveline system of claim 1, further comprising:
a first inverter electrically coupled to the first electric machine and a traction battery;
a second inverter electrically coupled to the second electric machine and the traction battery; and
a control unit including instructions that when executed cause the control unit to:
coordinate electric power flow to the first and second inverters from the traction battery.

10. The electric driveline system of claim 1, further comprising a heat exchanger coupled to a transmission housing or a vehicle frame and configured to transfer heat from a lubricant in the transmission to a coolant that is circulated through the heat exchanger.

11. A method for operation of an electric driveline system, comprising:
transferring rotational energy to a sun gear of a planetary gearset from a first electric machine and a second electric machine; and
shifting between a first gear configuration and a second gear configuration via:
engagement of a first friction clutch coupled to a ring gear of the planetary gearset and a synchronizer coupled to the first friction clutch; and
disengagement of a second friction clutch coupled to the sun gear of the planetary gearset; and
transferring rotational energy to one or more of a first axle and a second axle from a carrier in the planetary gearset.

12. The method of claim 11, further comprising transferring rotational energy from the first electric machine to a power take-off (PTO).

13. The method of claim 12, further comprising disconnecting the first axle from the electric driveline system via operation of a first disconnect clutch.

14. The method of claim 13, further comprising disconnecting the second axle from the electric driveline system via operation of a second disconnect clutch.

15. The method of claim 11, wherein the step of shifting between the first gear configuration and the second gear configuration is implemented by a driveline control unit (DCU) in electronic communication with a vehicle control unit (VCU).

16. An electric driveline system, comprising:
a powershift transmission including:
a planetary gearset with sun gear rotationally coupled to a first electric machine and a second electric machine;
a first output interface and a second output interface coupled to a carrier in the planetary gearset and to a first axle and a second axle, respectively;
a first friction clutch and a synchronizer coupled to a ring gear in the planetary gearset, wherein the first friction clutch is configured to brake the ring gear to shift the planetary gearset between a first gear configuration and a second gear configuration; and a second friction clutch coupled to the sun gear and configured to selectively couple the sun gear to an output shaft.

17. The electric driveline system of claim 16, further comprising:

a mechanical power take-off (PTO) and a PTO clutch coupled to the output shaft of the first electric machine or the second electric machine; and a control unit including instructions that when executed cause the control unit to:

allocate mechanical power distribution to the mechanical PTO and the planetary gearset based on a prioritization of a PTO power demand and a traction power demand.

18. The electric driveline system of claim 16, further comprising:

a third electric machine mechanically driving a lubricant pump; and a control unit including instructions that when executed cause the control unit to:

operate the lubricant pump and a valve coupled to the powershift transmission to adjust a flowrate of lubricant to the planetary gearset based on lubrication demands of the powershift transmission.

19. The electric driveline system of claim 18, wherein:

the third electric machine receives electric power from a lower voltage inverter and the first and second electric machines receive electric power from higher voltage inverters; or the first electric machine, the second electric machine, and the third electric machine receive electric power from inverters that have a similar operating voltage.

* * * * *